April 11, 1939.  C. A. DE GIERS  2,154,066
CONTENTS GAUGE FOR PLURALITY OF TANKS
Filed Sept. 25, 1936  4 Sheets-Sheet 1
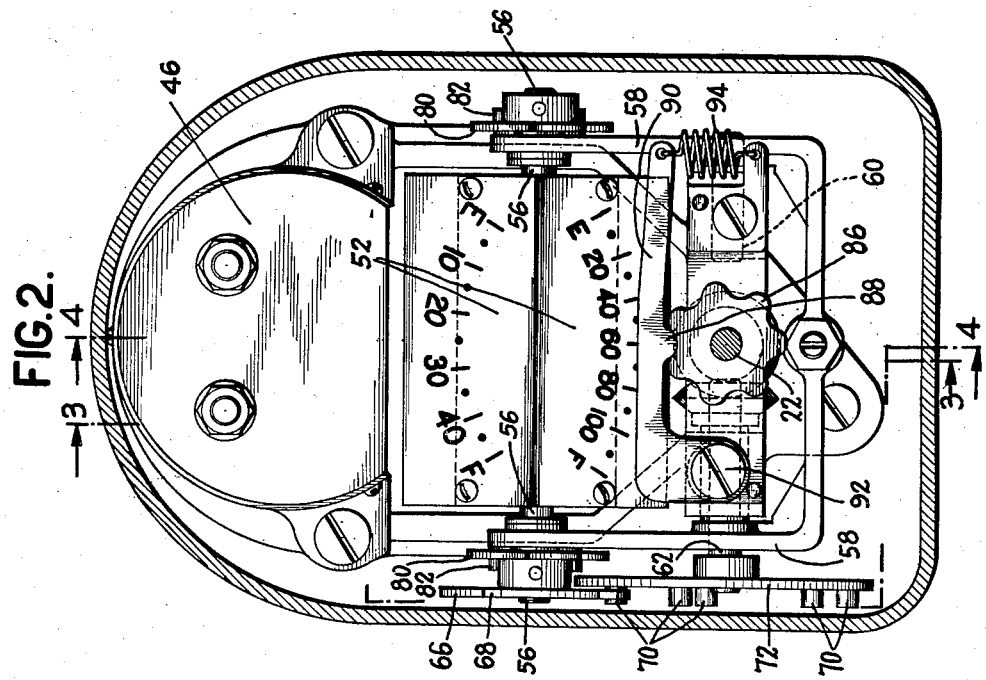
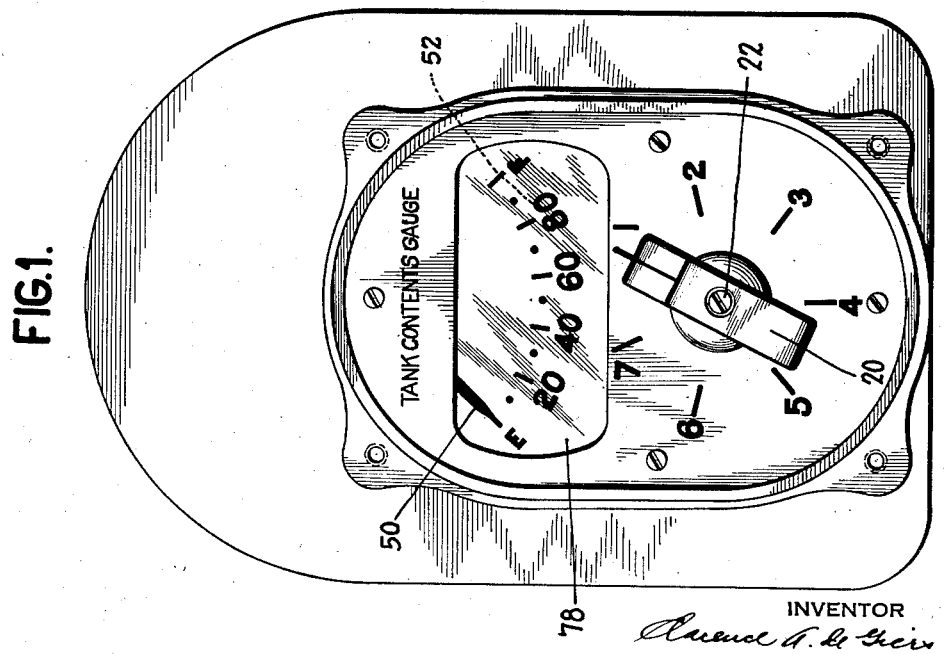
INVENTOR
Clarence A. De Giers
BY
Cooper, Kerr & Dunham
ATTORNEYS April 11, 1939.  C. A. DE GIERS  2,154,066
CONTENTS GAUGE FOR PLURALITY OF TANKS
Filed Sept. 25, 1936   4 Sheets-Sheet 2
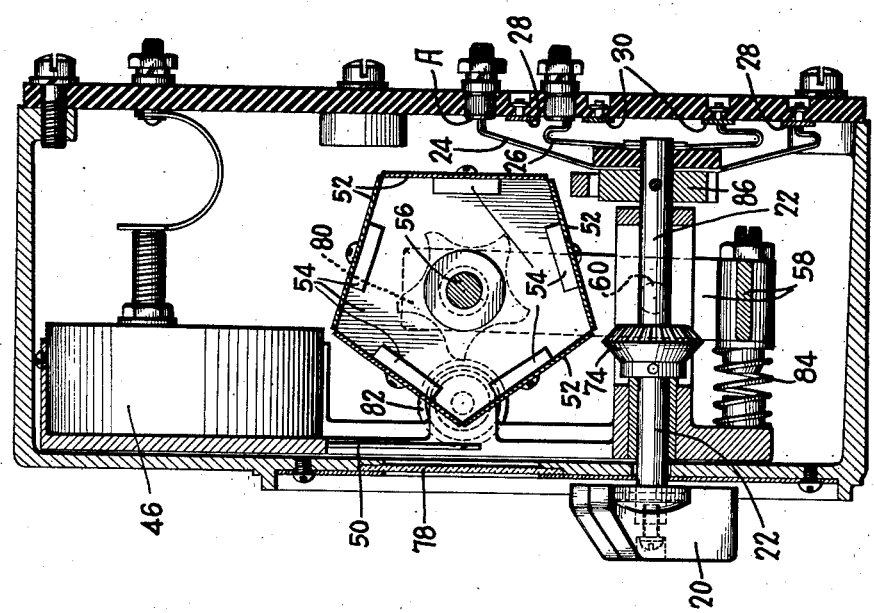
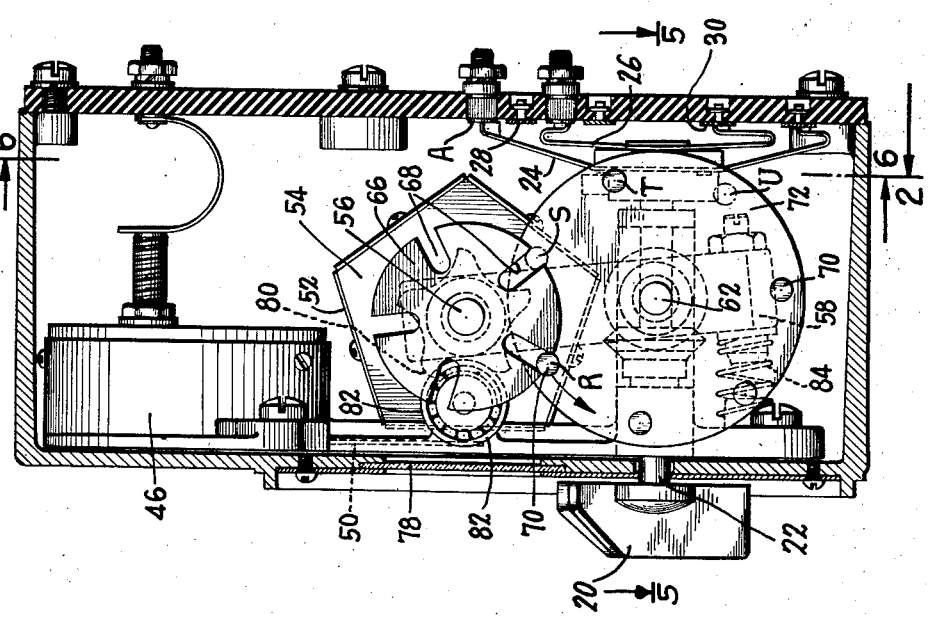

April 11, 1939.                C. A. DE GIERS                2,154,066
                    CONTENTS GAUGE FOR PLURALITY OF TANKS
                   Filed Sept. 25, 1936        4 Sheets-Sheet 3
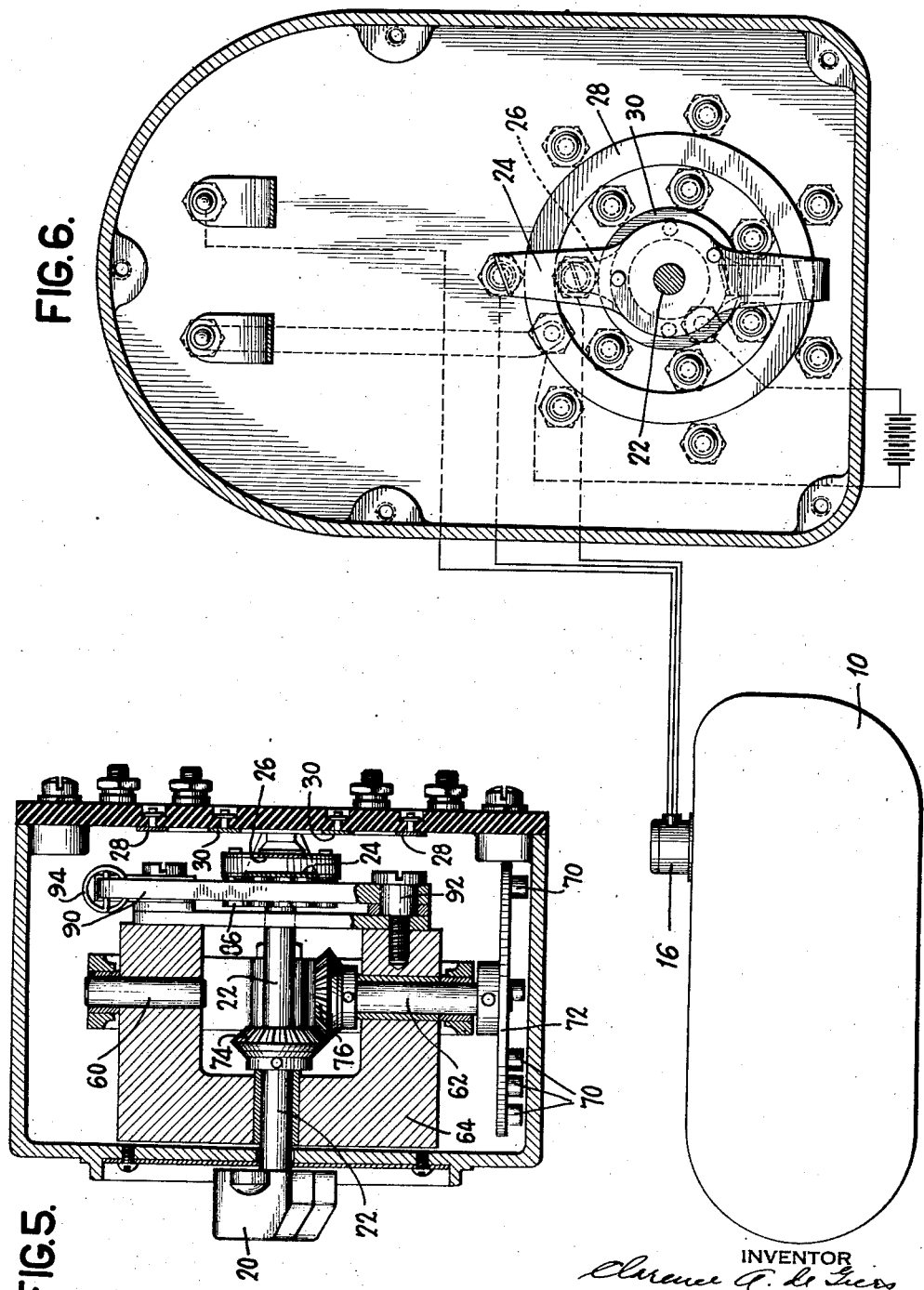

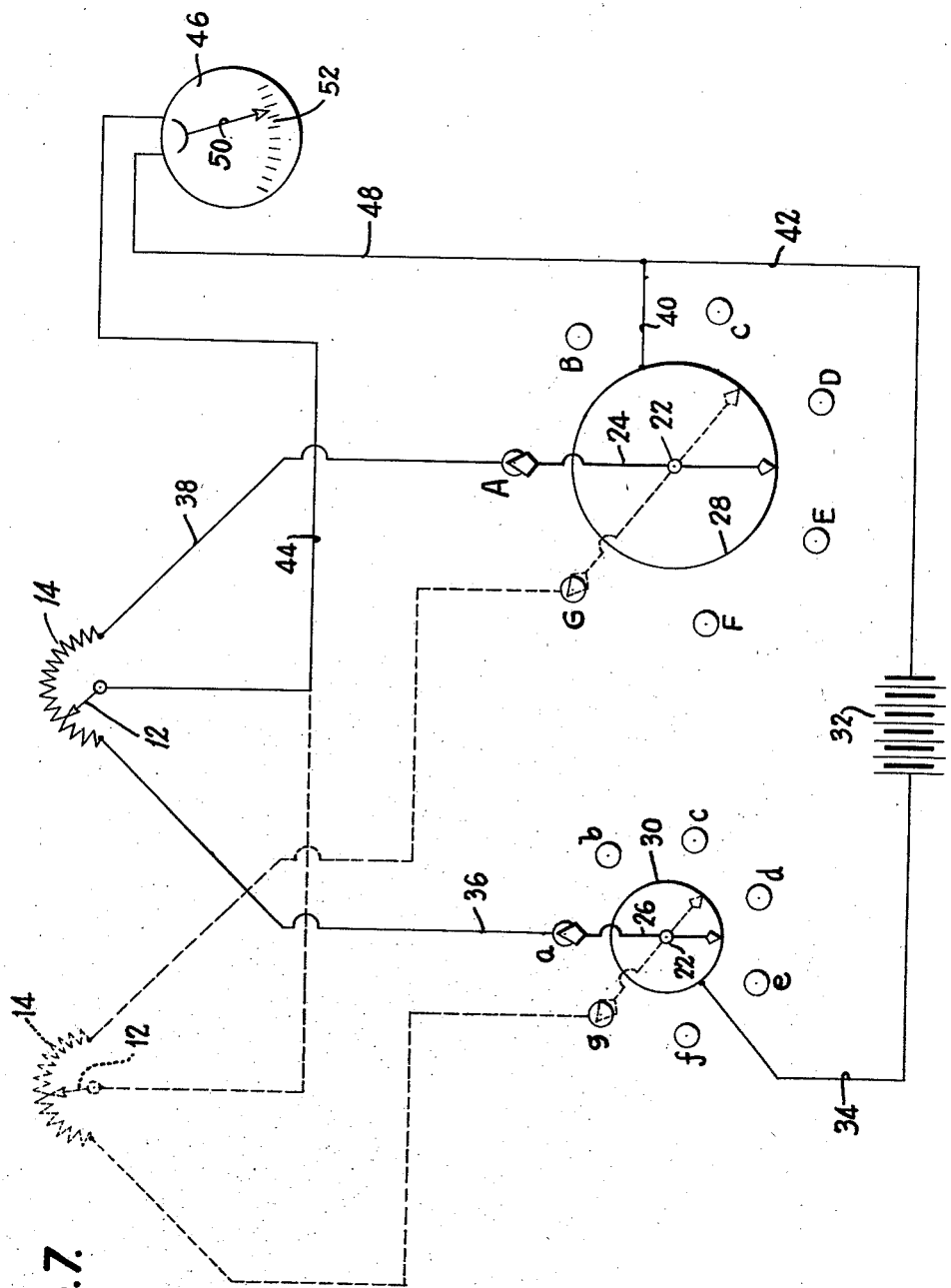

Patented Apr. 11, 1939

2,154,066

UNITED STATES PATENT OFFICE 2,154,066

CONTENTS GAUGE FOR PLURALITY OF TANKS

Clarence A. de Giers, Forest Hills, N. Y., assignor to The Liquidometer Corporation, Long Island City, N. Y., a corporation of Delaware Application September 25, 1936, Serial No. 102,458

12 Claims. (Cl. 73—301)

An object of the present invention is to provide a gauge for indicating the contents of a plurality of liquid-containing tanks, even though the tanks may be of different shapes and capacities.

The instrument is particularly adapted for use in airplanes, in which there are a number of tanks of various shapes and sizes scattered throughout the structure. Instrument panel space does not permit the installation of a separate indicator for each tank. The present invention enables one device on the instrument panel to selectively indicate the contents of each and every tank. Each tank is provided with a float-controlled rheostat or variable resistance unit. The instrument at the panel is provided with a manually settable selector switch so that any selected tank rheostat may be cut into circuit, as desired. If the tanks were of the same capacity and shape a single set of chart or dial graduations would answer for all the tanks, but since the tanks do vary in shape and size, the present invention provides that when the selector switch is turned to any particular tank, a chart suitable for that tank is simultaneously placed in operative position.

Further and other objects and advantages will be apparent from the specification and claims, and from the accompanying drawings which illustrate what is now considered the preferred embodiment of the invention.

Fig. 1 is a front view of the selector switch and chart set for tank No. 1.

Fig. 2 is a cross-section on line 2—2 of Fig. 3.

Fig. 3 is a cross-section on line 3—3 of Fig. 2.

Fig. 4 is a cross-section on line 4—4 of Fig. 2.

Fig. 5 is a cross-section on line 5—5 of Fig. 3.

Fig. 6 is a cross-section on line 6—6 of Fig. 3, and including a single electric circuit and tank.

Fig. 7 is a wiring diagram.

The invention is illustrated as applied to seven tanks, one of which is designated 10 (Fig. 6). Each tank contains a liquid-level float (not shown) which moves a rheostat shoe 12 (Fig. 7) along a resistance coil 14. On tank 10 (Fig. 6) the shoe 12 and rheostat 14 are contained in a dome-like casing 16 on top of the tank.

Switch key 20 is fast on the outer end of shaft 22, the inner end of which carries two contact springs 24 and 26, insulated from each other and from the rest of the device.

Contact member 24 has two arms, one short arm in continuous contact with a conducting ring 28, and one long arm, which, by turning key 20, may be placed in contact with any one of buttons A, B, C, D, E, F or G, arranged in a circle concentric with ring 28 (Fig. 7). Likewise, member 26 has a short arm always in contact with a ring 30 concentric with ring 28, and a longer arm in contact with the button a, b, c, d, e, f or g corresponding to the button with which arm 24 is in contact (Fig. 7).

With the above in mind, the indicating portion of the invention may readily be understood from the diagram, Fig. 7. If, for example, the pilot wants to know the contents of tank No. 1, he turns key 20 to numeral 1, as in Fig. 1. This places the long arms of 24 and 26 in contact with buttons A and a, respectively. Current then flows from source 32 through wire 34, ring 30, arm 26, button a, wire 36, resistance 14, wire 38, button A, arm 24, ring 28, wire 40 and wire 42 to source. From resistance 14 current also flows through shoe 12, wire 44, indicator 46, wire 48, and wire 42 to source. The amount of current flowing through instrument 46 is dependent on the position of shoe 12 on resistance 14, and the position of the shoe is controlled by the float, which, in turn, is controlled by the level of the liquid in the tank. Therefore pointer 50 of indicator 46 moves across chart 52 to a position indicating the quantity of liquid in the tank, the chart having been calibrated by previous tests to correspond with the particular size and shape of tank No. 1.

Should the operator wish to know the contents of any other tank, he turns key 20 to the number of that tank, thus setting up a new circuit through the rheostat at 14 on that particular tank. For instance, if the key be turned to tank No. 7, the circuit is the same as before except that arm 26 is on button g and arm 24 on button G, and current will flow through the No. 7 rheostat through the dotted lines of Fig. 7 and move indicator 50 accordingly. But since tank No. 7 differs in shape and size from tank No. 1, the chart used for tank No. 1 must be replaced by a chart calibrated to correspond with tank No. 7, otherwise indications would be false. The mechanism for changing charts will now be described.

Charts 52 are supported on the respective faces of the polygonal carrier 54 (Fig. 4). In the embodiment of the invention herein described, there are seven tanks, but only five charts, because there are two pairs of similar tanks so that two of the charts on the carrier are each used for two tanks, as will be explained. Carrier 54 is mounted on a shaft 56, the ends of which are supported for rotation in the upper ends of U-shaped yoke 58 (Fig. 2). Yoke 58 is supported for oscillation on the ends of shafts or trunnions 60, 62, projecting from machine frame 64 (Fig. 5).

Fast on shaft 56 is a disc 66 (Fig. 3), having radial slots 68 adapted for engagement by pins 70 projecting from the face of disc 72. Disc 72 is fast on shaft 62, rotatable by gears 74, 76, whenever switch key 20 is rotated. Thus, whenever the switch key is moved from one tank to the next, disc 72 is moved through the same angle, and a pin 70 entering a slot 68 rotates carrier shaft 56 to place the proper chart 52 in position to be observed.

For easy and correct reading the chart must be close to pointer 50 and observation window 78, but since the polygonal chart assembly cannot be rotated while in that position because its corners would interfere with the pointer and the window, mechanism is provided for automatically retracting the chart assembly from its operative position of Fig. 3 to the position of Fig. 4, to permit its rotation and for then moving it back into operative position at the completion of rotation. This mechanism comprises spoked cams 80, fast on shaft 56, and engaging rollers 82. While a chart is in operative position, cams 80, urged by compression spring 84, operating on the lower end of yoke 58, engage rollers 82 as in Fig. 3, permitting a chart to be in operative position, while the rollers and arms serve as an impositive lock to prevent inadvertent rotation of the chart assembly. When a pin 70, acting on disc 66, forces rotation of the chart assembly, a spoke of cam 80, acting against roller 82 forces the chart assembly to the position of Fig. 4, where it is free to rotate, and then further rotation of cams 80 permits the chart assembly to return to the position of Fig. 3 with the next chart in operative position. Another impositive lock for the mechanism is provided by undulated wheel 86 (Fig. 2) fast on shaft 22 and engaged by a tooth 88 on an arm 90, pivoted at 92 and held against wheel 86 by a spring 94.

As mentioned above, the instrument illustrated in the drawings has only five charts for seven tanks. This is possible because tanks 1 and 2 are alike in shape and dimensions, therefore the same chart serves for both. Likewise, and for the same reason, a single chart serves for tanks 3 and 4.

In Fig. 3, disc 72 rotates counterclockwise when key 20 rotates clockwise. Pin 70, designated R, has placed the chart for tank 1 in operative position, as in Fig. 1. There is no pin at position S, therefore, the next movement of key 20 from position 1 to position 2 (Fig. 1), although it rotates disc 72 a part revolution, will not move disc 66 because there is no pin at S, therefore the same chart remains in operative position to serve for tank No. 2. Then the next angular movement of disc 72 will cause pin 70 at position T to move disc 66 and place in position the chart for tank No. 3, and, since there is no pin at position U, that same chart will remain in position for tank No. 4.

It will be understood, of course, that each time key 20 is turned to a new station, an indicating circuit is set up through the rheostat in the designated tank in order to give correct information to the observer as to the contents of the particular tank to which key 20 is pointing.

It is to be understood that the invention is not limited to the specific embodiment herein illustrated and described, but may be used in other ways without departure from its spirit as defined by the following claims.

I claim:

1. In an instrument for indicating the liquid contents of a number of tanks of various sizes and dimensions, a chart for each of said tanks, an electric device controlled by the level of liquid in each of said tanks, an electrically-controlled indicator, a key movable to indicate any selected tank and effective to simultaneously establish a circuit through said indicator and the electric device of said selected tank, and means simultaneously controlled by said movable key for placing the chart for the selected tank in operative relationship with the indicator.

2. In an instrument for indicating the liquid contents of a number of tanks of various sizes and dimensions, a chart for each of said tanks, combined rotary and oscillatory means for supporting said charts, an indicator, and means for rotating and oscillating said chart supporting means in order to place the chart for any selected tank in direct operative relationship with said indicator whereby the contents of said tank may be accurately ascertained.

3. In an instrument for indicating the liquid contents of a number of tanks of various sizes and dimensions, a chart for each of said tanks, a polygonal carrier for supporting one chart on each face thereof, an indicator, means for rotating said carrier to place a chart in operative position with the indicator in direct relationship with the chart for accurate reading, and means for retracting said carrier during rotation thereof in order to prevent interference of said carrier with other parts of the indicating mechanism during rotation of the carrier.

4. In an instrument for indicating the liquid contents of a number of tanks of various sizes and dimensions, a movable chart calibrated for each tank, an indicator, means for placing said indicator in operative relationship with the tank selected for ascertaining the contents thereof, and means simultaneously controlled by said first mentioned means for placing the chart for the selected tank in operative relationship with the indicator.

5. In an instrument for indicating the liquid contents of a number of tanks of various sizes and dimensions, a movable chart calibrated for each tank, an electric device controlled by the level of liquid of each of said tanks, an electrically controlled indicator, means for establishing a circuit through said indicator and the electric device for any selected tank to be sounded for ascertaining the contents thereof, and means simultaneously operated by said first mentioned means for placing the chart for the selected tank in operative relationship with said indicator.

6. In an instrument for indicating the liquid contents of a number of tanks of various sizes and dimensions, a movable chart calibrated for each tank, an indicator having a pointer, manually controlled means for placing said indicator in operative relationship with the tank selected for ascertaining the contents of said tank, and means simultaneously controlled by said first mentioned means for placing the chart for the selected tank in operative relationship with said pointer.

7. In an instrument for indicating the liquid contents of a number of tanks of various sizes and dimensions, a chart for each of said tanks, a polygonal carrier for supporting one chart on each face thereof, an indicator adapted to move in a definite plane, a horizontally arranged bearing for said carrier upon which said carrier is adapted to rotate, means for rotating said carrier in order to place the chart for any selected tank in operative relation with said indicator whereby the contents of said tank may be ascertained, and means for rocking said bearing and the carrier mounted thereon during said rotation and in a rearward direction and then a forward direction toward the plane of movement of the indicator to permit the selected chart to assume a position in close proximity to said indicator for accurate reading when the carrier is in operative position for taking said reading, and further to prevent interference of said carrier with other parts of the indicating mechanism during its rotation for the purposes intended.

8. In an instrument for indicating the liquid contents of a number of tanks, a chart for each of said tanks, a carrier for supporting said charts, an indicator, a pivoted yoke mounted for rocking movement upon the instrument, said carrier being supported for rotation on said yoke, a cam member mounted for rotation with said carrier, a roller supported in cooperative relation with said cam member, and means for rotating said carrier in order to place a chart for any selected tank in operative relation with the indicator whereby the contents of said tank may be ascertained, said cam and roller mechanism operating to move said carrier in a rearward and then a forward direction toward the indicator as the carrier is rotated so as to position any particular chart in operative relation with said indicator and to prevent interference of said carrier with other parts of the indicating mechanism during its rotation.

9. In an instrument for indicating the liquid contents of a number of tanks of various sizes and dimensions, a chart for each of said tanks, an indicator, means for placing said indicator in operative relationship with the tank selected for ascertaining the contents thereof, a carrier for said charts, and a Geneva device simultaneously operated by said means for rotating the carrier in order to place the chart for any selected tank in operative relationship with said indicator whereby the contents of said tank may be ascertained.

10. In an instrument for indicating the liquid contents of a number of tanks of various sizes and dimensions, a chart for each of said tanks, a carrier for supporting said charts, an indicator, a Geneva device for intermittently rotating said carrier in order to place the chart for any selected tank in operative relationship with said indicator, a cam mounted for rotation with said carrier, and means cooperating with said cam for rocking said carrier during rotation to permit a chart for any selected tank to lie in close proximity to the indicator and at the same time permit the carrier to rotate without interference with other parts of the indicating mechanism.

11. In an instrument for indicating the liquid contents of a number of tanks of various sizes and dimensions, a chart for each of said tanks, a carrier for supporting said charts, said carrier being adapted for rotary and oscillatory movement, an indicator, cam means for oscillating the carrier in a rearward direction away from said indicator, spring means for moving the carrier in a direction toward the indicator for positioning a chart in close operative relationship with said indicator, and means for rotating said carrier in order to place a chart for any selected tank in operative relationship with the indicator whereby the contents of said tank may be ascertained.

12. In an instrument for indicating the liquid contents of a number of tanks of various sizes and dimensions, a chart for each of said tanks, a polygonal carrier for supporting one chart on each face thereof, an indicator, means for rotating said carrier in order to place the chart for any selected tank in operative relationship with said indicator whereby the contents of said tank may be ascertained, and means for shifting said carrier during rotation to move in a direction toward the indicator to position any one of the charts in close proximity to the indicator for accurate reading.

CLARENCE A. DE GIERS.